(12) United States Patent
Nguyen et al.

(10) Patent No.: US 10,266,754 B2
(45) Date of Patent: Apr. 23, 2019

(54) DEGRADABLE RETICULATED FOAM PARTICULATES FOR USE IN FORMING HIGHLY CONDUCTIVE PROPPANT PACKS

(71) Applicant: Halliburton Energy Services, Inc., Houston, TX (US)

(72) Inventors: Philip D. Nguyen, Houston, TX (US); Jimmie D. Weaver, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 31 days.

(21) Appl. No.: 15/105,193

(22) PCT Filed: Mar. 5, 2014

(86) PCT No.: PCT/US2014/020625
§ 371 (c)(1),
(2) Date: Jun. 16, 2016

(87) PCT Pub. No.: WO2015/134007
PCT Pub. Date: Sep. 11, 2015

(65) Prior Publication Data
US 2016/0319184 A1     Nov. 3, 2016

(51) Int. Cl.
| | |
|---|---|
| *E21B 43/28* | (2006.01) |
| *C09K 8/62* | (2006.01) |
| *C09K 8/80* | (2006.01) |
| *E21B 43/267* | (2006.01) |
| *C09K 8/70* | (2006.01) |
| *E21B 43/26* | (2006.01) |
| *C09K 8/94* | (2006.01) |

(52) U.S. Cl.
CPC ............... *C09K 8/62* (2013.01); *C09K 8/703* (2013.01); *C09K 8/80* (2013.01); *E21B 43/26* (2013.01); *E21B 43/267* (2013.01); *C09K 8/805* (2013.01); *C09K 8/94* (2013.01)

(58) Field of Classification Search
CPC .......... E21B 43/283; C09K 8/805; C09K 8/94
USPC ...................................................... 166/280.2
See application file for complete search history.

(56) References Cited

U.S. PATENT DOCUMENTS

| | | | |
|---|---|---|---|
| 6,439,309 | B1 | 8/2002 | Matherly et al. |
| 7,044,220 | B2 | 5/2006 | Nguyen et al. |
| 7,228,904 | B2 | 6/2007 | Todd et al. |
| 7,267,170 | B2 | 9/2007 | Mang et al. |

(Continued)

FOREIGN PATENT DOCUMENTS

WO     2015134007 A1     9/2015

OTHER PUBLICATIONS

International Search Report and Written Opinion for PCT/US2014/020625 dated Dec. 5, 2014.

*Primary Examiner* — Zakiya W Bates
*Assistant Examiner* — Ashish K Varma
(74) *Attorney, Agent, or Firm* — McGuireWoods LLP

(57) ABSTRACT

Methods including preparing a treatment fluid comprising a base fluid, degradable reticulated foam particulates, and non-degradable proppant particulates; introducing the treatment fluid into a subterranean formation comprising at least one fracture therein; placing the degradable reticulated foam particulates and the non-degradable proppant particulates into the at least one fracture, so as to form a stabilized proppant pack therein; and degrading the degradable reticulated foam particulates, thereby forming a high porosity propped fracture.

18 Claims, 1 Drawing Sheet

(56) References Cited

U.S. PATENT DOCUMENTS

| | | | |
|---|---|---|---|
| 7,334,636 B2 * | 2/2008 | Nguyen | C09K 8/80 |
| | | | 166/280.1 |
| 7,972,669 B2 | 7/2011 | Matsuoka et al. | |
| 8,268,901 B2 | 9/2012 | Britton et al. | |
| 2005/0059558 A1 * | 3/2005 | Blauch | C09K 8/62 |
| | | | 507/203 |
| 2005/0272613 A1 | 12/2005 | Cooke | |
| 2010/0256777 A1 | 10/2010 | Datta et al. | |
| 2012/0111565 A1 | 5/2012 | Garcia-Lopez De Victoria et al. | |
| 2013/0312962 A1 * | 11/2013 | Weaver | C09K 8/805 |
| | | | 166/280.1 |

* cited by examiner

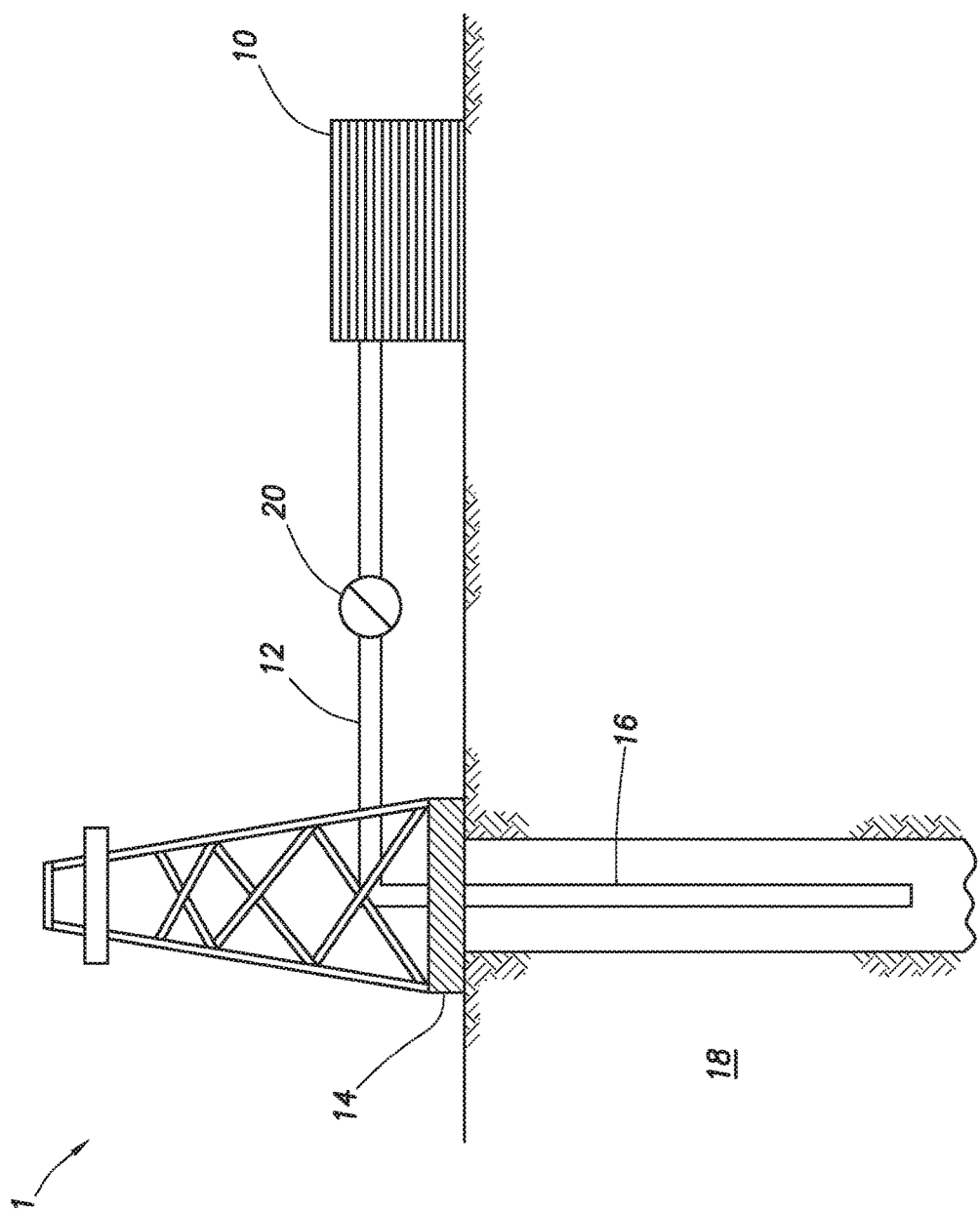

US 10,266,754 B2

DEGRADABLE RETICULATED FOAM PARTICULATES FOR USE IN FORMING HIGHLY CONDUCTIVE PROPPANT PACKS

BACKGROUND

The embodiments herein relate to forming highly conductive proppant packs, and more particularly, to forming highly conductive proppant packs using degradable reticulated foam particulates.

Subterranean wells (e.g., hydrocarbon producing wells, water producing wells, and the like) are often stimulated by hydraulic fracturing treatments. In a typical hydraulic fracturing treatment, a treatment fluid is pumped into a wellbore in a subterranean formation at a rate and pressure above the fracture gradient of the particular subterranean formation to breakdown the formation rock and create or enhance at least one fracture therein. Typically, particulate solids, such as graded sand, are introduced into the subterranean formation in a portion of the treatment fluid or in a subsequent treatment fluid and deposited into the fracture. These particulate solids, generally referred to as "proppant particulates" or "proppant," serve to prevent the fracture from fully closing once the hydraulic pressure is removed. By keeping the fracture from fully closing, the proppant particulates aid in forming conductive paths through which produced fluids, such as hydrocarbons (i.e., oil and/or gas), may flow.

The degree of success of a fracturing operation depends, at least in part, upon fracture porosity and conductivity once the fracturing operation is complete and production begins. Traditional fracturing operations place a volume of proppant particulates into a fracture to form a "proppant pack" in order to ensure that the fracture does not close completely upon removing the hydraulic pressure. The ability of the proppant particulates to maintain an open fracture depends, at least, upon the ability of the proppant particulates to withstand fracture closure pressures. The porosity of a proppant pack within a fracture is related to the interconnected interstitial spaces between abutting proppant particulates. Thus, the fracture productivity is closely related to the strength of the placed proppant particulates and the interstitial spaces between the proppant particulates in the proppant pack.

Generally, a proppant pack having sufficient strength to prevent a fracture from closing while simultaneously maximizing the interstitial spaces between each proppant particulate will be preferred, as the channels through which hydrocarbons may flow may be maximized. In some fracturing operations, increased flow channels may be achieved by intermittently pumping a substantially solids-free fluid with a proppant slurry, and thereafter removing the substantially solids-free fluid. In such cases, channels are formed between individual proppant packs. The intermittent pumping may require additional pumping equipment, fluid storage equipment, and/or labor at the well site. In other fracturing operations, increased flow channels may be achieved by including degradable materials in the proppant slurry and degrading such materials after the proppant pack is formed. Degradable materials may be cost prohibitive in some situations and/or may not be of the desired size or shape for use in a particular proppant pack without additional manufacturing alterations.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 1 depicts an embodiment of a system configured for delivering the treatment fluids of the embodiments described herein to a downhole location.

DETAILED DESCRIPTION

The embodiments herein relate to forming highly conductive proppant packs, and more particularly, to forming highly conductive proppant packs using degradable reticulated foam particulates.

Although some embodiments described herein are illustrated by reference to hydraulic fracturing treatments, the degradable reticulated foam particulates disclosed herein may be used in any subterranean formation operation, without departing from the scope of the present disclosure. Such treatment operations may include, but are not limited to, a drilling operation; a stimulation operation; an acidizing operation; an acid-fracturing operation; a sand control operation; a fracturing operation; a frac-packing operation; a remedial operation; a near-wellbore consolidation operation; and any combination thereof.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

In some embodiment described herein, a method is provided comprising preparing a treatment fluid comprising a base fluid, degradable reticulated foam particulates, and non-degradable proppant particulates. The treatment fluid may then be introduced into a subterranean formation having at least one fracture therein. The fracture may be a naturally-occurring fracture or may have been formed by introducing a pad fluid (e.g., a substantially solids-free fluid) into the formation at a rate and pressure sufficient to create or enhance the at least one fracture (i.e., above the fracture gradient). Upon introducing the treatment fluid into the subterranean formation, the degradable reticulated foam particulates and the non-degradable proppant particulates may be placed into the at least one fracture, so as to form a proppant pack therein. The degradable reticulated foam particulates may thereafter be degraded, thereby forming proppant-free channels as part of a high porosity propped fracture. As used herein, the term "high porosity propped fracture" (which may also be referred to as a "high porosity fracture") refers to a propped fracture having a porosity of greater than about 40%.

In some embodiments, the treatment fluid may further comprise a stabilizing agent. The stabilizing agent may penetrate a depth of the subterranean formation matrix at or adjacent to at least a portion of a face of the at least one fracture. As used herein, the term "fracture face" refers to a surface of a crack or breakage within a subterranean formation rock. Allowing the stabilizing agent to penetrate a depth of the formation may stabilize, or otherwise hold into place, loose particulates present or which may be later formed, such that they generally do not flow to the surface during hydrocarbon production. The stabilizing agent may additionally coat one or more of the degradable reticulated foam particulates and/or the non-degradable proppant particulates, thereby aiding in forming a stabilized proppant pack by virtue of the stabilizing agent being included in the treatment fluid or by first coating either the degradable reticulated foam particulates and/or the non-degradable proppant particulates with the stabilizing agent prior to including the coated particulates into the treatment fluid. In embodiments described herein, the stabilizing agent may serve either or both of these functions (i.e., stabilizing a portion of the formation matrix at or near the fracture face and/or stabilizing a portion of the proppant pack). In some preferred embodiments, the stabilizing agent may be at least partially coated onto only the non-degradable proppant particulates.

In some embodiments provided herein, a method is provided comprising preparing a first treatment fluid comprising a first base fluid and a first stabilizing agent. The first treatment fluid may be introduced into a subterranean formation having at least one fracture therein. In some embodiments, the first treatment fluid may be introduced into the subterranean formation at a rate and pressure sufficient to create or enhance at least one fracture therein. The first stabilizing agent may penetrate a depth into the subterranean formation at or adjacent to at least a portion of a face of the at least one fracture. A second treatment fluid may thereafter be introduced into the subterranean formation, the second treatment fluid comprising a second base fluid, degradable reticulated foam particulates, and non-degradable proppant particulates. Upon introducing the second treatment fluid into the subterranean formation, the degradable reticulated foam particulates and the non-degradable proppant particulates may be placed into the at least one fracture, so as to form a proppant pack therein. The presence of the stabilizing agent, while stabilizing loose particulates, may also aid in stabilizing the proppant pack in the fracture, thereby aiding the formation of the proppant pack. The degradable reticulated foam particulates may thereafter be degraded, thereby forming a high porosity propped fracture. In some embodiments, a second stabilizing agent may be included in the second treatment fluid so as to further provide stabilization of the formation matrix at or near the fracture face and/or stabilization of the proppant pack. The second stabilizing agent may, in some embodiments, be coated onto at least a portion of the degradable reticulated foam particulates and/or the non-degradable proppant particulates by virtue of the second stabilizing agent being included in the second treatment fluid or by first coating either the degradable reticulated foam particulates and/or the non-degradable proppant particulates with the second stabilizing agent prior to including the coated particulates into the second treatment fluid. In some preferred embodiments, the second stabilizing agent may be at least partially coated onto only the non-degradable proppant particulates.

The degradable reticulated foam particulates may be formed from any degradable material capable of degrading and capable of being formed into reticulated foam particulates. The degradable reticulated foam particulates may be prepared by any means known to those of skill in the art, without departing from the scope of the present disclosure. In some embodiments, degradable materials, such as those described herein, may be extruded to form particulates and during the extrusion process a gas (e.g., air) may be added to the degradable materials, causing them to form a very porous, low density solid foam (i.e., a reticulated foam). The degradable reticulated foam particulates described herein exhibit the qualities of a reticulated foam. As used herein, the term "reticulated foam" refers to an open foam, having few, if any, intact bubbles or cell windows (e.g., like a net). The reticulated nature of the degradable reticulated foam particulates described herein allows them to withstand fracture closure pressures and also beneficially reduce the amount of degradable material required to prepare the degradable reticulated foam particulates, thereby reducing, and in some cases substantially reducing, the cost of the fracturing operation.

The degradable reticulated foam particulates may form a portion of the proppant pack with the non-degradable proppant particulates described herein. One purpose of including the degradable reticulated foam particulates is to produce a high porosity propped fracture, whereby the degradable reticulated foam particulates are degraded after a proppant pack is formed and, thus, aid in ensuring permeability of the proppant pack. In some embodiments, the degradable reticulated foam particulates are oil-degradable materials. Where such oil-degradable materials are used, the oil-degradable materials may degrade upon contact with any oil, including produced hydrocarbons. Such oil-degradable materials may be beneficial if, for example, closure of the fracture undesirably compacts the proppant pack, thus undesirably reducing the permeability of the proppant pack. In such instances, the oil-degradable materials may degrade upon contact with produced fluids, thereby restoring at least some of the lost permeability.

In some embodiments, the degradable reticulated foam particulates may be degraded by any means capable of removing the degradable reticulated foam particulates from the proppant pack so as to form a high porosity propped fracture. Such degradation methods may include introducing a degradation agent into the subterranean formation (e.g., by injection), mixing the degradable reticulated foam particulates with a delayed reaction degradation agent (e.g., including the delayed reaction degradation agent(s) into a treatment fluid comprising the degradable reticulated foam particulates), or any other suitable methods to induce degradation.

Suitable materials may include, but are not limited to, a reticulated foamed degradable polymer, a reticulated foamed dehydrated salt, and any combination thereof.

A reticulated foamed degradable polymer is considered "degradable" herein if the degradation is due to, in situ, a chemical and/or radical process such as hydrolysis, oxidation, or UV radiation. The degradability of a reticulated foamed degradable polymer forming the degradable reticulated foam particulates described herein may depend, at least in part, on its backbone structure. For instance, the presence of hydrolysable and/or oxidizable linkages in the backbone often yields a material that will degrade as described herein. The rates at which such reticulated foamed degradable polymers degrade may be dependent on the type of repetitive unit, composition, sequence, length, molecular geometry, molecular weight, morphology (e.g., crystallinity, size of spherulites, orientation, and the like), hydrophilicity, hydrophobicity, surface area, additives, and the like. Also, the environment into which the reticulated foamed degradable polymer is subjected may affect how it degrades (e.g., temperature, presence of moisture, oxygen, microorganisms, enzymes, pH, and the like).

Suitable reticulated foamed degradable polymers for use in the embodiments herein may include, but are not limited to, a reticulated foamed dextran, a reticulated foamed cellulose, a reticulated foamed chitin, a reticulated foamed chitosan, a reticulated foamed protein, a reticulated foamed aliphatic polyester, a reticulated foamed poly(lactide), a reticulated foamed poly(glycolide), a reticulated foamed poly(ε-caprolactone), a reticulated foamed poly(hydroxybutyrate), a reticulated foamed poly(anhydride), a reticulated foamed aliphatic polycarbonate, a reticulated foamed aromatic polycarbonate, a reticulated foamed poly(orthoester), a reticulated foamed poly(amino acid), a reticulated foamed poly(ethylene oxide), a reticulated foamed polyphosphazene, and any combination thereof.

A reticulated foamed dehydrated salt may be used to form the degradable reticulated foam particulates of the present disclosure. Suitable reticulated foamed dehydrated salts for use in the embodiments herein may include, but are not limited to, a reticulated foamed anhydrous sodium tetraborate, a reticulated foamed anhydrous boric acid, a reticulated foamed boric oxide, a reticulated foamed organic salt, a reticulated foamed inorganic salt, and any combination thereof. The reticulated foamed anhydrous materials that may be used to form the reticulated foam particulates described herein may be only slightly soluble in water. However, with time and heat in a subterranean formation, the reticulated foamed anhydrous materials react with surrounding aqueous fluid and are hydrated. The resulting hydrated material is highly soluble in water and, as a result, degradable. In some instances, the total time required for the reticulated foamed anhydrous materials to degrade in an aqueous fluid is in the range of from a lower limit of about 8 hours, 16 hours, 24 hours, 32 hours, 40 hours, and 48 hours to an upper limit of about 72 hours, 64 hours, 56 hours, and 48 hours, and encompassing any subset therebetwen. A reticulated foamed organic salt or a reticulated foamed inorganic salt, such as a reticulated foamed acetate trihydrate, may also be suitable for forming the degradable reticulated foam particulates of the embodiments herein.

Blends of certain reticulated foamed degradable materials may also be suitable for forming the degradable reticulated foam particulates of the present disclosure. An example of a suitable blend may be a mixture of a reticulated foamed poly(lactide) and a reticulated foamed sodium borate (e.g., a reticulated foamed anhydrous sodium tetraborate), where the mixing of an acid and base could result in a neutral solution when such is desirable. Another example may be a mixture of a reticulated foamed poly(lactide) and a reticulated foamed boric oxide. Other materials that undergo an irreversible degradation may also be suitable, provided that the material is capable of being formed into a reticulated foam and the products of degradation do not undesirably interfere with either the conductivity of the proppant pack or the production of any desirable fluids from the subterranean formation.

In choosing the appropriate reticulated foamed degradable material, one should consider the degradation products that will result. These degradation products should not adversely affect other operations or components and may even be selected to improve the long-term performance/conductivity of the propped fracture. The choice of reticulated foamed degradable material also can depend, at least in part, on the conditions of the well (e.g., well bore temperature). For instance, lactides have been found to be suitable for lower temperature wells, including those within the range of 15.6° C. to 65.6° C. (60° F. to 150° F.), and poly(lactides) have been found to be suitable for well bore temperatures above this range. Also, poly(lactides) may be suitable for higher temperature wells. Some stereoisomers of poly(lactide) or mixtures of such stereoisomers may be suitable for even higher temperature applications. Dehydrated salts may also be suitable for higher temperature wells.

In some embodiments, a preferable result may be achieved if the reticulated foamed degradable material degrades slowly over time as opposed to instantaneously. In some embodiments, an even more preferable result may be achieved if the reticulated foamed degradable material does not begin to degrade until after the proppant pack has developed some compressive strength. The slow degradation of the reticulated foamed degradable material, in situ, may help to maintain the stability of the proppant matrix.

In some embodiments, the degradable reticulated foam particulates may further comprise a filler material. The filler material may be included in the degradable reticulated foam particulates to reduce the cost of manufacturing said particulates. The filling material may additionally be included to enhance the rate of degradation of the degradable reticulated foam particulates. Furthermore, the filler material may be used to provide structure or rigidity to the degradable reticulated foam particulates, for example, to further ensure that the degradable reticulated foam particulates are capable of withstanding fracture closure pressures. The filler material may also be included in the degradable reticulated foam particulates to alter their specific gravity, such that it is close to that of the non-degradable proppant particulates, thereby reducing the probability that the degradable reticulated foam particulates and the non-degradable proppant particulates are separated in the treatment fluid in which they are suspended. The separation of the degradable reticulated foam particulates and the non-degradable proppant particulates in the treatment fluid may result in a proppant pack having a non-uniform distribution of particulate types at any one location. In severe cases, this may result in a proppant pack having a porosity below that of the desired high porosity propped fractures described herein.

Suitable filler materials for use in forming the degradable reticulated foam particulates of the present disclosure may include, but are not limited to, silica, alumina, fumed carbon, carbon black, graphite, mica, titanium dioxide, a meta-silicate, calcium silicate, calcium carbonate, kaolin, talc, zirconia, boron, fly ash, a hollow glass microsphere, solid glass, an anhydrous salt, magnesium oxide, a mineral filler, barium sulfate, ethylenediaminetetraacedic acid, an oxidizer, a breaker, sodium persulfate, magnesium peroxide, and any combination thereof.

In some embodiments, the filler material may be present in forming the degradable reticulated foam particulates in an amount from a lower limit of about 5%, 10%, 15%, 20%, 25%, 30%, 35%, 40%, 45%, and 50% to an upper limit of about 95%, 80%, 85%, 80%, 75%, 70%, 65%, 60%, 55%, and 50% by weight of the degradable reticulated foam particulates.

The degradable reticulated foam particulates may be of any shape and size suitable for use in a subterranean formation and for forming a proppant pack with the non-degradable proppant particulates described herein. Suitable shapes for the degradable reticulated foam particulates may include, but are not limited to, platelet-shaped, shaving-shaped, fiber-shaped, flake-shaped, ribbon-shaped, rod-shaped, strip-shaped, spheroid-shaped, toroid-shaped, pellet-shaped, tablet-shaped, and any combination thereof. The mean size of the degradable reticulated foam particulates generally may range from a lower limit of about 2 mesh, 4 mesh, 6 mesh, 10 mesh, 20 mesh, 40 mesh, 60 mesh, 80 mesh, 100 mesh, 120 mesh, 140 mesh, 160 mesh, 180 mesh, and 200 mesh to an upper limit of about 400 mesh, 380 mesh, 360 mesh, 340 mesh, 320 mesh, 300 mesh, 280 mesh, 260 mesh, 240 mesh, 220 mesh, and 200 mesh, or less on the U.S. Sieve Series; however, in certain circumstances, other sizes or mixtures of sizes may be desired and will be entirely suitable for practice of the embodiments of the present disclosure. In particular embodiments, preferred mean size distribution ranges for the degradable reticulated foam particulates described herein are one or more of 6/12, 8/16, 12/20, 16/30, 20/40, 30/50, 40/60, 40/70, or 50/70 mesh.

In some embodiments, the degradable reticulated foam particulates may preferably be similar in particulate size and shape to the non-degradable proppant particulates to enhance the distribution of the degradable reticulated foam particulates and the non-degradable proppant particulates is substantially uniform. Therefore, the non-degradable proppant particulates may be any size or shape described herein with reference to the degradable reticulated foam particulates. Moreover, in some embodiments, the non-degradable proppant particulates may be shaped such that they are capable of interlocking, thereby providing stability (i.e., mechanical stability) to the proppant pack, particularly after the degradable reticulated foam particulates have degraded.

The non-degradable proppant particulates may additionally be formed from any non-degradable material capable of propping a fracture in a subterranean formation. Suitable materials for forming the non-degradable proppant particulates of the present disclosure may include, but are not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof.

In some embodiments, the non-degradable proppant particulates of the present disclosure may be present in a treatment fluid in an amount in the range of from a lower limit of about 0.5 pounds per gallon ("ppg"), 1 ppg, 2 ppg, 3 ppg, 4 ppg, 5 ppg, 6 ppg, 7 ppg, 8 ppg, 9 ppg, 10 ppg, 11 ppg, 12 ppg, 13 ppg, 14 ppg, and 15 ppg to an upper limit of about 30 ppg, 29 ppg, 28 ppg, 27 ppg, 26 ppg, 25 ppg, 24 ppg, 23 ppg, 22 ppg, 21 ppg, 20 ppg, 19 ppg, 18 ppg, 17 ppg, 16 ppg, and 15 ppg by volume of the treatment fluid. In some embodiments, the degradable reticulated foam particulates may be present in the treatment fluid in an amount in the range of from a lower limit of about 10%, 15%, 20%, 25%, 30%, 35%, 40%, and 50% to an upper limit of about 90%, 85%, 80%, 75%, 70%, 65%, 60%, 55%, and 50% of the combined weight of the non-degradable proppant particulates and the degradable reticulated foam particulates. In other embodiments, the degradable reticulated foam particulates may be present in the treatment fluid in an amount in the range of from about 25% to about 70% of the combined weight of the non-degradable proppant particulates and the degradable reticulated foam particulates. In yet other embodiments, the degradable reticulated foam particulates may be present in the treatment fluid in an amount in the range from about 25% to about 50% of the combined weight of the non-degradable proppant particulates and the degradable reticulated foam particulates. One of ordinary skill in the art, with the benefit of this disclosure, will recognize an optimum concentration of the degradable reticulated foam particulates to provide desirable values in terms of enhanced conductivity and permeability of the proppant pack without undermining the stability of the high porosity propped fracture itself.

The treatment fluids described herein (including the first and second treatment fluids) may comprise a stabilizing agent (including the first and second stabilizing agent), which in some cases may be included as a coating on at least a portion of either or both of the degradable reticulated foam particulate and the non-degradable proppant particulates. Suitable stabilizing agents for use in the present disclosure may include, but are not limited to, a non-aqueous tackifying agent, an aqueous tackifying agent, a silyl modified polyamide, a curable resin, an epoxy resin, a furan resin, a phenolic resin, a furfuryl aldehyde resin, a furfuryl alcohol resin, a siloxane, a polyethylenimine, a mixture of an epoxy silane and an amino silane, and any combination thereof. Stabilizing agents may be applied on-the-fly by including the stabilizing agent in the treatment fluid at the well site, directly prior to pumping the treatment fluid into the formation, or may be applied to coat the degradable reticulated foam particulates and/or the non-degradable proppant particulates at the well site, directly before including them into the treatment fluid to be pumped into the formation. As used herein, the term "on-the-fly" refers to performing an operation during a subterranean treatment that does not require stopping normal operations.

Non-aqueous tackifying agents suitable for use in the embodiments disclosed herein may be used such that they form a non-hardened coating, or may be combined with a multifunctional material capable of reacting with the non-aqueous tackifying compound to form a hardened coating. A "hardened coating" as used herein means that the reaction of the non-aqueous tackifying agent with the multifunctional material will result in a substantially non-flowable reaction product that exhibits a higher compressive strength in a consolidated agglomerate than the non-aqueous tackifying agent alone. In this instance, the non-aqueous tackifying agent may function similarly to a curable resin. Multifunctional materials suitable for use in the present disclosure may include, but are not limited to, an aldehyde (e.g., formaldehyde); a dialdehyde (e.g., glutaraldehyde, hemiacetals or aldehyde releasing compounds); a diacid halide; a dihalide (e.g., dichlorides and dibromides); a polyacid anhydride (e.g., citric acid, epoxides, furfuraldehyde, glutaraldehyde or aldehyde condensates); and any combination thereof. In some embodiments, the multifunctional material may be mixed with the non-aqueous tackifying agent in an amount of from a lower limit of about 0.01%, 0.5%, 0.1%, 0.5%, 1%, 5%, 10%, and 15% to an upper limit of about 50%, 45%, 40%, 35%, 30%, 25%, 20%, and 15% by weight of the non-aqueous tackifying agent. In other embodiments, the multifunctional material may be mixed with the non-aqueous tackifying agent in an amount of from about 0.5% to about 1% by weight of the non-aqueous tackifying agent.

Solvents suitable for use with the non-aqueous tackifying agents may include any solvent that is compatible with the non-aqueous tackifying agent and achieves the desired viscosity effect. The solvents that can be used in the embodiments disclosure herein may preferably include those having high flash points (most preferably above about 125° F. (51.7° C.)). Examples of solvents suitable for use in the embodiments herein with the non-aqueous tackifying agents may include, but are not limited to, butylglycidyl ether; dipropylene glycol methyl ether; butyl bottom alcohol; dipropylene glycol dimethyl ether; diethyleneglycol methyl ether; ethyleneglycol butyl ether; methanol; butyl alcohol; isopropyl alcohol; diethyleneglycol butyl ether; propylene carbonate; d'limonene; 2-butoxy ethanol; butyl acetate; furfuryl acetate; butyl lactate; dimethyl sulfoxide; dimethyl formamide; fatty acid methyl ester; and any combination thereof. It is within the ability of one skilled in the art, with the benefit of this disclosure, to determine whether a solvent is needed to achieve a viscosity suitable to the subterranean conditions and, if so, how much.

Generally, suitable aqueous tackifying agents for use in the embodiments herein are not significantly tacky when mixed with or coated onto the degradable reticulated foam particulates and/or the non-degradable proppant particulates or penetrated into a depth of the subterranean formation at or near a fracture face, but are capable of being "activated" (that is destabilized, coalesced and/or reacted) to transform the compound into a sticky, tackifying compound at a desirable time. Such activation may occur before, during, or after the aqueous tackifying agent is placed in the subterranean formation. In some embodiments, a pretreatment may be first contacted with the surface of the degradable reticulated foam particulates and/or the non-degradable proppant particulates or the fracture faces of the subterranean formation to prepare them to be coated with an aqueous tackifying agent. Suitable aqueous tackifying agents may generally be charged polymers that comprise compounds that, when in an aqueous solvent or solution, will form a non-hardening coating (by itself or with an activator) and, when placed on the non-degradable and/or degradable particulate, will increase the continuous critical re-suspension velocity thereof when contacted by a stream of aqueous fluid.

Examples of aqueous tackifying agents suitable for use in the embodiments herein may include, but are not limited to, an acrylic acid polymer; an acrylic acid ester polymer; an acrylic acid derivative polymer; an acrylic acid homopolymer; an acrylic acid ester homopolymer (e.g., poly(methyl acrylate), poly(butyl acrylate), and poly(2-ethylhexyl acrylate)); an acrylic acid ester co-polymer; a methacrylic acid derivative polymer; a methacrylic acid homopolymer; a methacrylic acid ester homopolymer (e.g., poly(methyl methacrylate), poly(butyl methacrylate), and poly(2-ethylhexyl methacrylate)); an acrylamido-methyl-propane sulfonate polymer; an acrylamido-methyl-propane sulfonate derivative polymer; an acrylamido-methyl-propane sulfonate copolymer; an acrylic acid/acrylamido-methyl-propane sulfonate copolymer; and any combination thereof.

Silyl-modified polyamide compound may be used as the stabilizing agent in some embodiments described herein. The silyl-modified polyamide compounds suitable for use as a stabilizing agent in the methods of the present disclosure may be described as substantially self-hardening compositions that are capable of at least partially adhering to the subterranean formation at or near a fracture face and/or to degradable reticulated foam particulates and/or the non-degradable proppant particulates described herein in the unhardened state, and that are further capable of self-hardening into a substantially non-tacky state. Such silyl-modified polyamide compounds may be based, for example, on the reaction product of a silating compound with a polyamide or a mixture of polyamides. The polyamide or mixture of polyamides may be one or more polyamide intermediate compounds obtained, for example, from the reaction of a polyacid (e.g., diacid or higher) with a polyamine (e.g., diamine or higher) to form a polyamide polymer with the elimination of water. Other suitable silyl-modified polyamides and methods of making such compounds are described in U.S. Pat. No. 6,439,309.

Curable resins suitable for use as the stabilizing agent in some embodiments described herein may be any resins known in the art that are capable of forming a hardened, consolidated mass. Some suitable curable resins may include, but are not limited to, a two component epoxy based resin; a novolak resin; a polyepoxide resin; a phenol-aldehyde resin; a urea-aldehyde resin; a urethane resin; a phenolic resin; a furan resin; a furan/furfuryl alcohol resin; a phenolic/latex resin; a phenol formaldehyde resin; a polyester resin; a polyester resin hybrid; a polyester resin copolymer; a polyurethane resin; a polyurethane resin hybrid; a polyurethane resin copolymer; an acrylate resin; a silicon-based resin; and any combination thereof. Some suitable curable resins, such as epoxy resins, may be cured with an internal catalyst or activator so that when pumped down hole, they may be cured using only time and temperature. Other suitable curable resins, such as furan resins, generally require a time-delayed catalyst or an external catalyst to help activate the polymerization of the resins if the cure temperature is low (i.e., less than 250° F. (121.1° C.)), but will cure under the effect of time and temperature if the formation temperature is above about 250° F. (121.1° C.), preferably above about 300° F. (148.9° C.). It is within the ability of one skilled in the art, with the benefit of this disclosure, to select a suitable curable resin for use in embodiments described herein and to determine whether a catalyst is required to trigger curing.

Any solvent that is compatible with the curable resin and achieves the desired viscosity effect is suitable for use in the embodiments described herein. Preferred solvents include those listed below in connection with tackifying agents. It is within the ability of one skilled in the art, with the benefit of this disclosure, to determine whether and how much solvent is needed to achieve a suitable viscosity.

Generally, the stabilizing agent may be added in any amount capable of stabilizing loose particulates at or near the fracture faces in the subterranean formation and/or stabilizing the proppant pack in the fractures. In some embodiments, the stabilizing agent may be present in an amount of from a lower limit of about 0.1%, 0.25%, 0.5%, 0.75%, 1%, 1.25%, 1.5%, 1.75%, 2%, 2.25%, and 2.5% to an upper limit of about 5%, 4.75%, 4.5%, 4.25%, 4%, 3.75%, 3.5%, 3.25%, 3%, 2.75%, and 2.5% by weight of the combined degradable reticulated foam particulates and non-degradable proppant particulates.

The treatment fluids of the present invention may include a base fluid (including the first and second base fluids described herein). Any base fluid suitable for use in a subterranean formation and that does not adversely affect the high porosity propped fractures described herein may be used in accordance with the embodiments of the present disclosure. Suitable base fluids may include, but not be limited to, oil-based fluids; aqueous-based fluids; aqueous-miscible fluids; water-in-oil emulsions; oil-in-water emulsions; and any combination thereof. Suitable oil-based fluids may include, but are not limited to, alkanes, olefins, aromatic organic compounds, cyclic alkanes, paraffins, diesel fluids, mineral oils, desulfurized hydrogenated kerosenes, and any combination thereof. Suitable aqueous-based fluids may include fresh water, saltwater (e.g., water containing one or more salts dissolved therein), brine (e.g., saturated salt water), seawater, and any combination thereof. Suitable aqueous-miscible fluids may include, but not be limited to, alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), polyglycol amines, polyols, any derivative thereof, any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), any in combination with an aqueous-based fluid, and any combination thereof. Suitable water-in-oil and oil-in-water emulsions may comprise any water or oil component described herein. Suitable water-in-oil emulsions, also known as invert emulsions, may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, where the amount may range from any lower limit to any upper limit and encompass any subset therebetween. Suitable oil-in-water emulsions may have a water-to-oil ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, where the amount may range from any lower limit to any upper limit and encompass any subset therebetween. It should be noted that for water-in-oil and oil-in-water emulsions, any mixture of the above may be used including the water being and/or comprising an aqueous-miscible fluid.

Generally, the water that may form part or all of a base fluid may be from any source, provided that it does not contain components that might adversely affect the stability and/or performance of the treatment fluids or the high porosity propped fracture. In certain embodiments, the density of the aqueous fluid may be adjusted, among other purposes, to provide additional particulate (i.e., transport of the non-degradable particulates, the degradable particulates, and/or the proppant particulates) transport and suspension in the treatment fluids used in the methods of the embodiments disclosed herein. In certain embodiments, the pH of the fluid may be adjusted (e.g., by a buffer or other pH adjusting agent), among other purposes, to activate a crosslinking agent and/or to reduce the viscosity of the treatment fluid (e.g., activate a breaker, deactivate a crosslinking agent). One of ordinary skill in the art, with the benefit of this disclosure, will recognize when such density and/or pH adjustments are appropriate. In some embodiments, the pH range may preferably be from about 4 to about 11.

In some embodiments, the treatment fluids described herein may further comprise an additive selected from the group consisting of a salt, a weighting agent, an inert solid, a fluid loss control agent, an emulsifier, a dispersion aid, a corrosion inhibitor, an emulsion thinner, an emulsion thickener, a viscosifying agent, a gelling agent, a surfactant, a lost circulation material, a foaming agent, a gas, a pH control additive, a breaker, a biocide, a crosslinker, a stabilizer, a chelating agent, a scale inhibitor, a gas hydrate inhibitor, an oxidizer, a reducer, a friction reducer, a clay stabilizing agent, and any combination thereof.

In various embodiments, systems configured for delivering the treatment fluids (including the first and second treatment fluids) described herein to a downhole location are described. In various embodiments, the systems can comprise a pump fluidly coupled to a tubular, the tubular containing the treatment fluids described herein. It will be appreciated that while the system described below may be used for delivering the treatment fluids, each of the first or second treatment fluids is delivered separately into the subterranean formation.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluids to a subterranean formation at or above a fracture gradient of the subterranean formation, but it may also be used in cases where fracturing is not desired. In some embodiments, the high pressure pump may be capable of fluidly conveying particulate matter, such as the non-degradable particulates, the degradable particulates, and the proppant particulates described in some embodiments herein, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluids to the high pressure pump. In such embodiments, the low pressure pump may "step up" the pressure of the treatment fluids before reaching the high pressure pump.

In some embodiments, the systems described herein can further comprise a mixing tank that is upstream of the pump and in which the treatment fluids are formulated. In various embodiments, the pump (e.g., a low pressure pump, a high pressure pump, or a combination thereof) may convey the treatment fluids from the mixing tank or other source of the treatment fluids to the tubular. In other embodiments, however, the treatment fluids may be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluids may be drawn into the pump, elevated to an appropriate pressure, and then introduced into the tubular for delivery downhole.

FIG. 1 shows an illustrative schematic of a system that can deliver the treatment fluids of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which the treatment fluids of the embodiments herein may be formulated. The treatment fluids may be conveyed via line 12 to wellhead 14, where the treatment fluids enter tubular 16, tubular 16 extending from wellhead 14 into subterranean formation 18. Upon being ejected from tubular 16, the treatment fluids may subsequently penetrate into subterranean formation 18. Pump 20 may be configured to raise the pressure of the treatment fluids to a desired degree before introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

A. A method comprising: preparing a treatment fluid comprising a base fluid, degradable reticulated foam particulates, and non-degradable proppant particulates; introducing the treatment fluid into a subterranean formation comprising at least one fracture therein; placing the degradable reticulated foam particulates and the non-degradable proppant particulates into the at least one fracture, so as to form a stabilized proppant pack therein; and degrading the degradable reticulated foam particulates, thereby forming a high porosity propped fracture.

B. A method comprising: preparing a first treatment fluid comprising a first base fluid and a first stabilizing agent; preparing a second treatment fluid comprising a second base fluid, degradable reticulated foam particulates, and non-degradable proppant particulates; introducing the first treatment fluid into a subterranean formation at a rate and pressure sufficient to create or enhance at least one fracture therein, wherein the first stabilizing agent penetrates a depth into the subterranean formation at or adjacent to a face of the at least one fracture; introducing the second treatment fluid into the subterranean formation; placing the degradable reticulated foam particulates and the non-degradable proppant particulates into the at least one fracture, so as to form a stabilized proppant pack therein; and degrading the degradable reticulated foam particulates, thereby forming a high porosity propped fracture.

Each of embodiments A and B may have one or more of the following additional elements in any combination:

Element 1: Wherein the treatment fluid further comprises a stabilizing agent.

Element 2: Wherein the stabilizing agent is included in the treatment fluid by at least partially coating at least one of the degradable reticulated foam particulates and the non-degradable proppant particulates with the stabilizing agent.

Element 3: Wherein the second treatment fluid further comprises a second stabilizing agent.

Element 4: Wherein the second stabilizing agent is included in the second treatment fluid by at least partially coating at least one of the degradable reticulated foam particulates and the non-degradable proppant particulates with the second stabilizing agent.

Element 5: Wherein the stabilizing agent is selected from the group consisting of a curable resin, an aqueous tackifying agent, a non-aqueous tackifying agent, a silyl modified polyamide, an epoxy resin, a furan resin, a phenolic resin, a furfuryl aldehyde resin, a furfuryl alcohol resin, a siloxane, a polyethylenimine, a mixture of an epoxy silane and an amino silane, and any combination thereof.

Element 6: wherein the non-degradable proppant particulates are interlocking.

Element 7: Wherein the degradable reticulated foam particulates are selected from the group consisting of a reticulated foamed degradable polymer, a reticulated foamed dehydrated salt, and any combination thereof.

Element 8: Wherein the reticulated foamed degradable polymer is selected from the group consisting of a reticulated foamed dextran, a reticulated foamed cellulose, a reticulated foamed chitin, a reticulated foamed chitosan, a reticulated foamed protein, a reticulated foamed aliphatic polyester, a reticulated foamed poly(lactide), a reticulated foamed poly(glycolide), a reticulated foamed poly(E-caprolactone), a reticulated foamed poly(hydroxybutyrate), a reticulated foamed poly(anhydride), a reticulated foamed aliphatic polycarbonate, a reticulated foamed aromatic polycarbonate, a reticulated foamed poly(orthoester), a reticulated foamed poly(amino acid), a reticulated foamed poly (ethylene oxide), a reticulated foamed polyphosphazene, and any combination thereof.

Element 9: Wherein the reticulated foamed dehydrated salt is selected from the group consisting of a reticulated foamed anhydrous sodium tetraborate, a reticulated foamed anhydrous boric acid, a reticulated foamed boric oxide, a reticulated foamed organic salt, a reticulated foamed inorganic salt, and any combination thereof.

Element 10: Wherein the degradable reticulated foam particulates further comprise a filler material.

Element 11: Wherein the filler material is selected from the group consisting of silica, alumina, fumed carbon, carbon black, graphite, mica, titanium dioxide, a meta-silicate, calcium silicate, calcium carbonate, kaolin, talc, zirconia, boron, fly ash, a hollow glass microsphere, solid glass, an anhydrous salt, magnesium oxide, a mineral filler, barium sulfate, ethylenediaminetetraacedic acid, an oxidizer, a breaker, sodium persulfate, magnesium peroxide, and any combination thereof.

Element 12: Wherein the degradable reticulated foam particulates have a shape selected from the group consisting of platelet-shaped, shaving-shaped, fiber-shaped, flake-shaped, ribbon-shaped, rod-shaped, strip-shaped, spheroid-shaped, toroid-shaped, pellet-shaped, tablet-shaped, and any combination thereof.

Element 13: Further comprising a wellhead with a tubular extending therefrom and into the subterranean formation and a pump coupled to the tubular, wherein the step of: introducing the treatment fluid into the subterranean formation, comprises introducing the treatment fluid into the tubular.

Element 14: Further comprising a wellhead with a tubular extending therefrom and into the subterranean formation and a pump coupled to the tubular, wherein the step of: introducing the first treatment fluid into the subterranean formation, comprising introducing the first treatment fluid into the tubular, and the step of: introducing the second treatment fluid into the subterranean formation, comprises introducing the second treatment fluid into the tubular.

By way of non-limiting example, exemplary combinations applicable to A, B and C include: A with 1 and 2; A with 5 and 12; A with 6, 7, and 13; B with 3 and 4; B with 9 and 10; B with 7 and 13.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
preparing a treatment fluid comprising a base fluid, degradable reticulated foam particulates, non-degradable proppant particulates, and a stabilizing agent at least partially coated only on the non-degradable proppant particles;
introducing the treatment fluid into a subterranean formation comprising at least one fracture therein;
placing the degradable reticulated foam particulates and the non-degradable proppant particulates into the at least one fracture, so as to form a stabilized proppant pack therein; and
degrading the degradable reticulated foam particulates, thereby forming a high porosity propped fracture,
wherein the degradable reticulated foam particulates has a mean size from about 2 mesh to about 400 mesh, U.S. Sieve Series, and wherein the degradable reticulated foam particulates comprise a filler material.

2. The method of claim 1, wherein the treatment fluid further comprises a stabilizing agent.

3. The method of claim 2, wherein the stabilizing agent is included in the treatment fluid by at least partially coating at least one of the degradable reticulated foam particulates and the non-degradable proppant particulates with the stabilizing agent.

4. The method of claim 2, wherein the stabilizing agent is selected from the group consisting of a curable resin, an aqueous tackifying agent, a non-aqueous tackifying agent, a silyl modified polyamide, an epoxy resin, a furan resin, a phenolic resin, a furfuryl aldehyde resin, a furfuryl alcohol resin, a siloxane, a polyethylenimine, a mixture of an epoxy silane and an amino silane, and any combination thereof.

5. The method of claim 1, wherein the non-degradable proppant particulates are interlocking.

6. The method of claim 1, wherein the degradable reticulated foam particulates are selected from the group consisting of a reticulated foamed degradable polymer, a reticulated foamed dehydrated salt, and any combination thereof.

7. The method of claim 6, wherein the reticulated foamed degradable polymer is selected from the group consisting of a reticulated foamed dextran, a reticulated foamed cellulose, a reticulated foamed chitin, a reticulated foamed chitosan, a reticulated foamed protein, a reticulated foamed aliphatic polyester, a reticulated foamed poly(lactide), a reticulated foamed poly(glycolide), a reticulated foamed poly(ε-caprolactone), a reticulated foamed poly(hydroxybutyrate), a reticulated foamed poly(anhydride), a reticulated foamed aliphatic polycarbonate, a reticulated foamed aromatic polycarbonate, a reticulated foamed poly(orthoester), a reticulated foamed poly(amino acid), a reticulated foamed poly(ethylene oxide), a reticulated foamed polyphosphazene, and any combination thereof.

8. The method of claim 6, wherein the reticulated foamed dehydrated salt is selected from the group consisting of a reticulated foamed anhydrous sodium tetraborate, a reticulated foamed anhydrous boric acid, a reticulated foamed boric oxide, a reticulated foamed organic salt, a reticulated foamed inorganic salt, and any combination thereof.

9. The method of claim 1, wherein the filler material is at least one of silica, alumina, fumed carbon, carbon black, graphite, mica, titanium dioxide, a meta-silicate, calcium silicate, calcium carbonate, kaolin, talc, Zirconia, boron, fly ash, a hollow glass micro sphere, Solid glass, an anhydrous salt, magnesium oxide, a mineral filler, barium sulfate, ethylenediaminetetraacedic acid, an oxidizer, a breaker, Sodium persulfate, magnesium peroxide.

10. The method of claim 1, wherein the degradable reticulated foam particulates have a shape selected from the group consisting of platelet-shaped, shaving-shaped, fiber-shaped, flake-shaped, ribbon-shaped, rod-shaped, strip-shaped, spheroid-shaped, toroid-shaped, pellet-shaped, tablet-shaped, and any combination thereof.

11. The method of claim 1, further comprising a wellhead with a tubular extending therefrom and into the subterranean formation and a pump coupled to the tubular, wherein the step of: introducing the treatment fluid into the subterranean formation, comprises introducing the treatment fluid into the tubular.

12. A method comprising:
preparing a first treatment fluid comprising a first base fluid and a first stabilizing agent;
preparing a second treatment fluid comprising a second base fluid, degradable reticulated foam particulates, non-degradable proppant particulates, and a second stabilizing agent coated onto only the non-degradable proppant particulates;
introducing the first treatment fluid into a subterranean formation at a rate and pressure sufficient to create or enhance at least one fracture therein,
wherein the first stabilizing agent penetrates a depth into the subterranean formation at or adjacent to a face of the at least one fracture;
introducing the second treatment fluid into the subterranean formation;
placing the degradable reticulated foam particulates and the non-degradable proppant particulates into the at least one fracture, so as to form a stabilized proppant pack therein; and
degrading the degradable reticulated foam particulates, thereby forming a high porosity propped fracture,
wherein the degradable reticulated foam particulates has a mean size from about 2 mesh to about 400 mesh, U.S. Sieve Series, and wherein the degradable reticulated foam particulates comprise a filler material.

13. The method of claim 12, wherein the non-degradable proppant particulates are interlocking.

14. The method of claim 12, wherein the degradable reticulated foam particulates are selected from the group consisting of a reticulated foamed degradable polymer, a reticulated foamed dehydrated salt, and any combination thereof.

15. The method of claim 14, wherein the reticulated foamed degradable polymer is selected from the group consisting of a reticulated foamed dextran, a reticulated foamed cellulose, a reticulated foamed chitin, a reticulated foamed chitosan, a reticulated foamed protein, a reticulated foamed aliphatic polyester, a reticulated foamed poly(lactide), a reticulated foamed poly(glycolide), a reticulated foamed poly(ε-caprolactone), a reticulated foamed poly(hydroxybutyrate), a reticulated foamed poly(anhydride), a reticulated foamed aliphatic polycarbonate, a reticulated foamed aromatic polycarbonate, a reticulated foamed poly(orthoester), a reticulated foamed poly(amino acid), a reticulated foamed poly(ethylene oxide), a reticulated foamed polyphosphazene, and any combination thereof.

16. The method of claim 14, wherein the reticulated foamed dehydrated salt is selected from the group consisting of a reticulated foamed anhydrous sodium tetraborate, a reticulated foamed anhydrous boric acid, a reticulated foamed boric oxide, a reticulated foamed organic salt, a reticulated foamed inorganic salt, and any combination thereof.

17. The method of claim 12, wherein the filler material is at least one of silica, alumina, fumed carbon, carbon black, graphite, mica, titanium dioxide, a meta-silicate, calcium silicate, calcium carbonate, kaolin, talc, Zirconia, boron, fly ash, a hollow glass micro sphere, Solid glass, an anhydrous salt, magnesium oxide, a mineral filler, barium sulfate, ethylenediaminetetraacedic acid, an oxidizer, a breaker, Sodium persulfate, magnesium peroxide.

18. The method of claim 12, further comprising a wellhead with a tubular extending therefrom and into the subterranean formation and a pump coupled to the tubular, wherein the step of: introducing the first treatment fluid into the subterranean formation, comprising introducing the first treatment fluid into the tubular,
and the step of: introducing the second treatment fluid into the subterranean formation, comprises introducing the second treatment fluid into the tubular.

* * * * *